United States Patent Office 2,940,926
Patented June 14, 1960

2,940,926

MOLECULAR SIEVE ADSORPTION PROCESS UTILIZING A TWO-STAGE DESORPTION TECHNIQUE

Alfred M. Henke, Springdale, and Harry C. Stauffer, Cheswick, Pa., assignors to Gulf Research & Development Company, Pittsburgh, Pa., a corporation of Delaware No Drawing. Filed Dec. 31, 1957, Ser. No. 706,290

3 Claims. (Cl. 208—310)

This invention relates to a process for separating hydrocarbon fractions. More particularly, it relates to an improvement in molecular sieve separation of mixtures of aromatics and paraffins whereby a high yield of a fraction enriched in aromatics is obtained.

The separation of hydrocarbon fractions is an important operation in petroleum refining. Most often the separation is made by fractional distillation which separates the hydrocarbons into fractions of different boiling ranges. However, a procedure that can segregate the different molecular types, such as aromatics, straight chain paraffins and branched chain paraffins, or produce fractions enriched in one molecular type or another is also very valuable, because some of these types of hydrocarbons are more valuable than others.

Certain crystalline dehydrated zeolites, known as molecular sieves, have the ability to adsorb certain types of molecules such as straight chain paraffins while rejecting other types of molecules and this property can be relied on for separating a mixture of different molecular types. We have now developed an improvement in the use of these molecular sieves for separating hydrocarbon mixtures into fractions enriched in desired molecular types. Our process employs a new procedure for removing material retained by a column of 5 Angstrom molecular sieves with consequent improvement in separation.

Our process employs a new procedure for removing carbon fraction containing aromatics and straight chain paraffins with molecular sieves having a channel diameter of 5 Angstrom units. An unadsorbed fraction enriched in cyclic hydrocarbons passes through the molecular sieves and is recovered as the first product fraction. The sieves are purged with a purge gas at a temperature below 100° F. and a fraction enriched in normal paraffins is recovered as the second product fraction. Thereafter, the sieves are purged with a purge gas at a temperature above 400° F. and a third fraction enriched in aromatics is recovered.

In a preferred embodiment of our process the charge stock is a gasoline range fraction produced by catalytic reforming, and containing aromatics, branched chain paraffins and straight chain paraffins. This reformate is charged as a liquid to a column of 5 Angstrom molecular sieves. A first fraction enriched in aromatics is recovered as unadsorbed percolate. A second fraction enriched in saturates is recovered by purging the column with an inert gas at a temperature below 100° F. A third fraction enriched in aromatics is recovered by purging the column with an inert gas at a temperature above 400° F. The first and third fractions are combined to obtain a product of high octane rating and the second fraction is again subjected to catalytic reforming to increase its octane rating.

As is known in the art, molecular sieves are crystalline dehydrated zeolites, natural or synthetic, having a well defined physical structure. Chemically, these zeolites are hydrous aluminum silicates generally containing one or more sodium, potassium, strontium, calcium or barium cations, although zeolites containing hydrogen, ammonium or other metal cations are also known. These zeolites have a characteristic three-dimensional aluminum silicate anionic network, the cations neutralizing the anionic charge. Upon dehydration, the three-dimensional lattice network of the crystal is maintained, leaving intercommunicating channels, pores or interstices of molecular dimensions within the crystal lattice. The cross-sectional diameter of such channels can vary, dehydrated three-dimensional zeolites having channels with cross-sectional diameters of about 4, 5, 6, 10 and 13 Angstrom units being known. However, for each zeolite of this type, the narrowest cross-sectional diameter of the channels is a characteristic and is substantially uniform and fixed throughout the crystal. Thus, materials are available having channel diameters of substantially all 4 Angstrom units, all 5 Angstrom units or all 6 Angstrom units, etc., as the case may be. It is, therefore, conventional in the art to characterize the crystalline, dehydrated, three-dimensional zeolites as molecular sieves of a definite channel diameter, for example, molecular sieves having a channel diameter of 5 Angstrom units, or even more simply, 5 Angstrom molecular sieves. It is a characteristic feature of this invention that the separation of normal paraffins from branched chain paraffins and cyclic hydrocarbons takes place only with 5 Angsrtom molecular sieves and not with the 4 or 6 Angstrom molecular sieves.

According to prior suggestions for the use of molecular sieves to separate mixtures of aromatics and straight chain paraffins, only two product fractions should be recovered in each cycle, one being the unadsorbed percolate and the other being the material removed from the column by high temperature purging. It was presumed that the straight chain paraffins, because of their relatively small molecular dimensions, would enter the 5 Angstrom channels and, therefore be retained by the molecular sieves while all or most of the larger molecules such as cyclic hydrocarbons and branched chain paraffins, being excluded from these channels, would percolate through the column to form a percolate highly concentrated in the larger molecules. We have discovered that an improvement in the separation is obtained by purging the material retained in the column in stages which differ in purging severity. Thus, by purging the column at mild severity we obtain a purge fraction enriched in normal paraffins and by purging under severe conditions we obtain another fraction enriched in aromatics. The concentrating of aromatics is thus greatly improved. By combining the fraction obtained by the severe purging with the aromatics-enriched percolate a considerably improved yield of a fraction enriched in aromatics is obtained.

We do not wish to be bound by theoretical explanations of our results. However, we can give an explanation that is reasonable. We believe that, contrary to prior understandings of the use of 5 Angstrom molecular sieves for separating aromatics and straight chain paraffins, the sieves strongly retain not only the normal paraffins but also aromatics. The normal paraffins presumably are held in the 5 Angstrom channels as previously supposed but aromatics are also held in the bed of solid particles by surface adsorption or other forces. Mild purging of the sieves, for example, purging with an inert gas at less than 100° F. preferentially removes the normal paraffins held in the molecular sieve channels. Then severe purging, such as purging with an inert gas at above 400° F., substantially completes the removal of material retained in the sieves and thus forms a fraction enriched in aromatics retained by adsorption within the molecular sieve column. By thus employing purge procedures adapted to remove preferentially one or the other of the molecular types retained in the column we accomplish a considerably better concentrating of molecular types than was previously possible.

The following example demonstrates results we have obtained in separating a catalytic reforming product by our process.

*Example 1*

The fraction to be separated was a debutanized reformed naphtha having a boiling range of about 128 to 411° F., a gravity of 48.3° API, a knock rating of 88.6 Research (clear) and containing 49.0 percent aromatics, 1.5 percent olefins and 49.5 saturates. The separation column was filled with molecular sieves of 5 Angstrom units channel diameter and composed of calcium alumino-silicates. The sieves were in the form of small pellets or granules of about 1/16 inch diameter. The molecular sieves were dried by flowing through the column a stream of dried, purified nitrogen for several hours at about 300° F. and a space velocity of 60 gaseous volumes (standard temperature and pressure) per volume of molecular sieves per hour. The molecular sieves were cooled to room temperature (about 70-80° F.) and the liquid reformate was charged to the column upflow at a liquid-hourly space velocity of 0.5 volume of reformate per volume of molecular sieves per hour. The unadsorbed percolate emerging from the column was collected as the first product fraction. This was continued until a predetermined amount of liquid had been charged. The sieves were saturated at this point and the charging of reformate and the collection of percolate was stopped. Liquid was then drained from the bottom of the column. This drainage liquid had about the same composition as the charge stock. This was unadsorbed liquid that occupied the larger spaces in the column and had undergone very little, if any, molecular sieve separation. After draining, the column was subjected to a low temperature gas purge. Dried, purified nitrogen was flowed downwardly through the column at a space velocity of 320 volumes of gas (standard temperature and pressure) per volume of sieves per hour for three hours at room temperature (70-80° F.). The hydrocarbons were condensed from the nitrogen purging gas stream and collected as cold purge liquid or second product fraction. After the low temperature purge, the column was subjected to high temperature, downflow nitrogen purging with dried, purified nitrogen and a space velocity of 320 volumes (standard temperature and pressure) of nitrogen per volume of molecular sieves per hour. During this stage the temperature was raised from room temperature to 500° F. over a period of about three hours and thereafter maintained at 500° F. for another three hours. The hydrocarbons were condensed from the nitrogen stream and collected as the third product fraction.

The separation achieved in two runs (A and B) carried out as described in Example 1 is shown in the following table:

| Run | Charge | A | B |
|---|---|---|---|
| Percolate: | | | |
| Throughput, Wt./Wt. | | 1.33 | 1.47 |
| Yield, Percent by Vol. of Charge | | 65.3 | 67.9 |
| Inspections— | | | |
| Hydrocarbon Type FIA, Percent by Vol.: | | | |
| Aromatics | 49.0 | 55.9 | 52.8 |
| Olefins | 1.5 | 1.8 | 1.5 |
| Saturates | 49.5 | 42.3 | 45.7 |
| Knock Rating: Micro Research Method Octane No., Clear | 88.6 | 91.5 | 90.7 |
| Drainage: | | | |
| Yield, Percent by Vol. of Charge | | 20.9 | 18.9 |
| Inspections— | | | |
| Hydrocarbon Type FIA, Percent by Vol.: | | | |
| Aromatics | | 51.1 | 49.6 |
| Olefins | | 1.6 | 1.5 |
| Saturates | | 47.3 | 48.9 |
| Cold Purge Liquid: | | | |
| Yield, Percent by Vol. of Charge | | 4.3 | 7.0 |
| Loading, Lb./Lb. of Mol. Sieves | | 0.1 | 0.15 |
| Inspections— | | | |
| Hydrocarbon Type FIA, Percent by Vol.: | | | |
| Aromatics | | 27.3 | 36.1 |
| Olefins | | 1.9 | 1.5 |
| Saturates | | 70.8 | 62.4 |
| Hot Purge Liquid: | | | |
| Yield, Percent by Vol. of Charge | | 9.2 | 6.2 |
| Loading, Lb./Lb. of Mol. Sieves | | 0.2 | 0.1 |
| Inspections— | | | |
| Hydrocarbon Type FIA, Percent by Vol.: | | | |
| Aromatics | | 55.6 | 53.9 |
| Olefins | | 2.2 | 1.3 |
| Saturates | | 42.2 | 44.8 |

The three product fractions shown in the table for runs A and B are the percolate, the cold purge liquid and hot purge liquid. In each run the drainage liquid had a composition very similar to that of the charge. As mentioned above, it had undergone little if any separation and would be recycled to the molecular sieves in the next separation cycle. The results show that our method produces two fractions enriched in aromatics and one enriched in saturates. Thus, in run A the percolate fraction contained about 56 percent aromatics as compared with 49 percent aromatics in the charge. The content of saturates was 42.3 percent as compared with 49.5 percent in the charge. It should be understood, however, that the saturates portion of the percolate is considerably richer in branched chain paraffins than is the saturates portion of the charge. The percolate fraction of Run A had a knock rating Research (clear) of 91.5, compared with 88.6 for the charge.

The second product fraction of run A, the cold purge liquid, was highly concentrated in saturates, having a saturates content of 70.8 percent. Furthermore, the the saturates portion of this fraction was richer in straight chain paraffins than was the saturates portion of the charge.

The third product fraction was the hot purge liquid. This was similar to the percolate fraction and was enriched in aromatics. The production of this latter fraction is an important advantage of our process. By dividing the purging phase of the separation into low temperature and high temperature stages we segregate a large portion of highly aromatic liquid from the adsorbed material enriched in saturates. This result is unexpected in view of prior understandings of molecular sieve separations. Since the percolate and the hot purge liquid are both enriched in aromatics they can be combined to produce a high yield of a fraction enriched in aromatics. Thus, in run A we obtained an aromatics-enriched fraction (about 56 percent aromatics) in a single-pass yield amounting to 74.5 percent of the charge (65.3+9.2) instead of a yield of only 65.3 percent that would have been obtained without our plural-stage purging. Similarly, in run B the yield of the aromatics fraction was increased by about 6 percent by our procedure.

The increase in yield of the aromatics-enriched fraction is only one advantage of our process. Another important advantage is that the saturates fraction is considerably richer in saturates than would be so if all material retained by the sieves were purged as one fraction. Since the cold purge liquid is so highly concentrated in saturates (especially normal paraffins) it can be efficiently subjected to further upgrading designed specifically for such materials without subjecting large amounts of other materials such as aromatics to a treatment that will not improve them. Thus, when a reforming product is separated by our process the saturates fraction can be recycled to the catalytic reforming reactor or reformed in another reactor or subjected to another conversion process such as hydroisomerization.

In the example above we have described charging to the molecular sieves a predetermined amount of the mixture to be separated. In run A this resulted in 1.33 pounds of percolate per pound of sieves and in run B, 1.47 pounds of percolate per pound of sieves. We determine empirically the proper ratio of charge to molecular sieves. The ratio will vary with different mixtures to be separated. Before separating any particular mixture the proper ratio of charge weight or volume to molecular sieve weight or volume can be determined by small scale tests. This can be done by measuring the amount of liquid that can be charged to a small column of sieves before the composition, the octane rating or other property of the percolate shows that the degree of separation has decreased substantially.

The adsorbing capacity of the molecular sieves for any particular component of a hydrocarbon mixture is influenced by the temperature and partial pressure of the component. Raising the temperature of the sieves decreases the amount of hydrocarbon adsorbed in the 5 Angstrom channels at a given partial pressure of the hydrocarbon. Lowering the partial pressure of the hydrocarbon at a given temperature also decreases the amount of the hydrocarbon adsorbed in the channels of the sieves.

We control temperature and partial pressure of the hydrocarbons and the molecular sieves during the charging stage and the purging stages of our process to accomplish the desired adsorption and removal of hydrocarbons. Thus, in the charging stage, that is to say, the initial stage in each cycle during which the mixture to be separated is contacted with the molecular sieves, we maintain a rather low temperature and a pressure of at least one atmosphere. In the example we described charging the hydrocarbon mixture to the molecular sieves at room temperature (about 70 to 80° F.) and at atmospheric pressure. The temperature of the sieves and the mixture to be separated should be low when they are contacted but must be above the freezing point of the hydrocarbons. The charging stage temperature should be at least as low as the temperature of the cold purge stage, or in other words, should be below 100° F. Ambient temperature will usually be satisfactory provided that it is lower than 100° F. In cyclic use the sieves should be cooled to below 100° F. and preferably to below 80° F. after the hot purge stage and before the charging stage of each new cycle.

Atmospheric pressure is preferred for the charging stage. With some hydrocarbon mixtures the adsorbing capacity of the sieves for the desired components is increased by arising the total pressure above atmospheric pressure. However, with the mixtures for which our process is most suitable, namely, gasoline range hydrocarbon mixtures, the adsorbing capacity of the sieves is usually sufficient at a pressure of one atmosphere.

In the purging stages the partial pressure of the adsorbed hydrocarbons is reduced by the presence of a large volume of purge gas. In both purging stages we use a purge gas space velocity of 20 to 500 volumes (at standard temperature and pressure) of purging gas per volume of molecular sieves per hour in order to reduce sufficiently the ability of the sieves to retain hydrocarbons. In the cold purging stage the temperature of the sieves is substantially the same as in the charging stage and, therefore, the main effect relied on for removal of hydrocarbons is reduction of partial pressure by the large volume of purge gas. The flow of purge gas at a space velocity of 20 to 500 volumes (STP) per volume of molecular sieves per hour is continued for a long enough time to remove adequately the adsorbed straight chain paraffins without removing excessively the aromatics. At a temperature below 100° F. as employed in our cold purging stage, a total throughput of about 100 to 1,000 volumes of purge gas (STP) per volume of sieves at a space velocity of 20 to 500 volumes per hour will usually be satisfactory.

In the hot purge stage of our process we remove retained hydrocarbons not only by reduction of partial pressure through the use of a large volume of purging gas, but also by raising the temperature to at least 400° F. but below the cracking temperature of the hydrocarbons. In the hot purge stage the rate of flow of purging gas, as in the cold purge stage, should be 20 to 50 volumes of gas (STP) per volume of sieves per hour. The hot purge should continue for a long enough time to remove adequately the remaining hydrocarbons enriched in aromatics. Usually, as in the cold purge stage, a total throughput of from 100 to 1,000 volumes of gas (STP) per volume of sieves will be satisfactory. For substantially complete removal of the hydrocarbons we prefer to carry out the hot purge at a temperature of a least 600° F. but lower than the cracking temperature of the hydrocarbons being purged. The preferred temperature range for the hot purge stage is 500 to 650° F. For a temperature of this range the total throughput of hot purge gas should be at least about 300 volumes of gas (at standard temperature and pressure) per volume of sieves. At the higher permissible purging temperatures the volume of purging gas required for adequate removal of the hydrocarbons is less than required at lower temperatures.

Since the absorptive capacity of the molecular sieves is decreased by decreasing the partial pressure of the adsorbed hydrocarbon, a sub-atmospheric total pressure can be used with advantage during the purging of the sieves to aid removal of the adsorbed material. However, for economic reasons we prefer simply to flow the purge gas through the sieves at atmospheric pressure.

We have described the use of nitrogen as a purge gas. Nitrogen and other unreactive gases such as helium, argon and neon are preferred but other gases can be used, including hydrogen, carbon dioxide, steam, air and hydrocarbon gases such as methane, ethane, propane, etc. However, many of these gases will be useful only if the conditions are selected to avoid certain hazards. For example, oxygen or air will create an explosion hazard and may also cause oxidation of materials being separated unless the purge temperature is sufficiently low. In any event, the purge gas should be one that is readily separated from the desorbed hydrocarbons, for example, by condensing the hydrocarbons, as in the separation of the hydrocarbons from nitrogen purge gas in the example. Normally, it will be preferred to use the same type of purge gas in the cold purge and hot purge stages of our process. However, different gases can be used in the two stages if desired.

We have explained that in general our process is used for separating mixtures of aromatics and straight chain paraffins. Thus, the process can be applied to a mixture containing only these two molecular types. Such mixtures are rare, however, and normally other molecular types will be present, including branched chain paraffins and naphthenes.

The mixture described in the example is a type of mixture for which our process is particularly well adapted, namely, a reformate or a product of catalytic reforming of a low octane gasoline or naphtha. Products of this kind contain aromatics, branched chain paraffins and straight chain paraffins. Since the straight chain paraffins have lower octane ratings than the other components it is highly advantageous to remove them in the most selective manner possible. Our process does this very well, segregating a small fraction enriched in the straight chain paraffins and a large fraction enriched in aromatics. The paraffinic fraction can then be recycled to the reforming stage or charged to a reforming reactor under other conditions or subjected to other conversions adapted for upgrading straight chain paraffins such as hydroisomerization. Although reforming products are well suited for separation by our process, our process can be used for separating in general, any mixtures of aromatics and straight chain paraffins of the gasoline or gas oil boiling ranges.

In the example described above, the molecular sieves were in the form of small granules or pellets of about $1/16$ inch diameter and were disposed in a fixed bed or column. The particle size is not critical, but for fixed-bed percolation it is preferred that the sieves be in the form of pellets or granules of at least $1/16$ inch or $1/8$ inch diameter so as to obtain proper liquid flow without channeling. A fixed-bed percolation process is made continuous by providing two or more beds or columns of molecular sieves, one of which will be undergoing charging while others are being purged. It is also possible to operate our process continuously by employing moving beds of the molecular sieves in accordance with known techniques.

Obviously many modifications and variations of the invention as hereinbefore set forth may be made without departing from the spirit and scope thereof and therefore only such limitations should be imposed as are indicated in the appended claims.

We claim:

1. The separation process which comprises contacting with molecular sieves of 5 Angstrom units channel diameter a hydrocarbon charge mixture containing aromatics and straight chain paraffins, recovering from the sieves an unadsorbed first product fraction richer in aromatics than said hydrocarbon charge mixture, thereafter in a low-temperature purging stage flowing a purging gas through said sieves at a temperature below 100° F., at a space velocity of at least 20 volumes (STP) of gas per volume of molecular sieves per hour, for a gas throughput from 100 to 1,000 volumes (STP) of gas per volume of molecular sieves, recovering from said purging gas a hydrocarbon fraction enriched in straight chain paraffins, thereafter in a high temperature purging stage flowing a purging gas through said sieves at a temperature of at least 400° F., a space velocity of at least 20 volumes (STP) of gas per volume of molecular sieves per hour, for a gas throughout from 100 to 1,000 volumes (STP) of gas per volume of molecular sieves, and recovering from said purging gas another fraction richer in aromatics than said charge mixture.

2. The separation process which comprises charging to a bed of molecular sieves of 5 Angstrom units channel diameter at a pressure of at least one atmosphere and at a temperature less than 100° F. a hydrocarbon charge mixture containing aromatics and straight chain paraffins, recovering from the sieves an unadsorbed first product percolate fraction richer in aromatics than said hydrocarbon charge mixture, discontinuing the charging of said mixture to said bed of molecular sieves before the composition of said percolate indicates a substantial decrease in the degree of separation of said mixture, draining from said bed of molecular sieves liquid held up therein but corresponding substantially in composition to said mixture, thereafter in a low temperature purging stage flowing a purging gas through said bed at a temperature below 100° F. at a space velocity of at least 20 volumes (STP) of gas per volume of molecular sieves per hour, for a gas throughput from 100 to 1,000 volumes (STP) of gas per volume of molecular sieves, recovering from said purging gas a second product hydrocarbon fraction richer in straight chain paraffins than said hydrocarbon charge mixture, thereafter in a high temperature purging stage flowing a purging gas through said bed at a temperature of at least 400° F., a space velocity of at least 20 volumes (STP) of gas per volume of molecular sieves per hour, for a gas throughput from 100 to 1,000 volumes (STP) of gas per volume of molecular sieves, and recovering a third fraction of said hydrocarbon mixture, said third fraction being richer in aromatics than said charge mixture.

3. The process which comprises charging to a bed of molecular sieves of 5 Angstrom units channel diameter at a pressure of at least one atmosphere and at a temperature less than 100° F. a reformate containing aromatics and straight chain paraffins, recovering from the sieves an unadsorbed first product percolate fraction richer in aromatics than said reformate, discontinuing the charging of said reformate to said bed of molecular sieves before the composition of said percolate indicates a substantial decrease in the degree of separation of said reformate, draining from said bed of molecular sieves liquid held up therein but corresponding substantially in composition to said reformate, thereafter in a low temperature purging stage flowing a purging gas through said bed at a temperature below 100° F. at a space velocity of at least 20 volumes (STP) of gas per volume of molecular sieves per hour, for a gas throughput from 100 to 1,000 volumes (STP) of gas per volume of molecular sieves, recovering from said purging gas a second product hydrocarbon fraction richer in straight chain paraffins than said reformate, thereafter in a high temperature purging stage flowing a purging gas through said bed at a temperature from 500 to 650° F., a space velocity of at least 20 volumes (STP) of gas per volume of molecular sieves per hour, for a gas throughput from 100 to 1,000 volumes (STP) of gas per volume of molecular sieves, recovering from said purging gas a third fraction of said reformate richer in aromatics than said reformate, combining said first and third products to form a high octane gasoline product and recycling said second fraction richer in straight chain paraffins than said reformate to catalytic reforming.

References Cited in the file of this patent

UNITED STATES PATENTS

| | | |
|---|---|---|
| 2,818,137 | Richmond et al. | Dec. 31, 1957 |
| 2,818,449 | Christensen et al. | Dec. 31, 1957 |

UNITED STATES PATENT OFFICE

CERTIFICATE OF CORRECTION

Patent No. 2,940,926　　　　　　　　　　　　　June 14, 1960

Alfred M. Henke et al.

It is hereby certified that error appears in the printed specification of the above numbered patent requiring correction and that the said Letters Patent should read as corrected below.

Column 1, lines 41 and 42, for "Our process employs a new procedure for removing carbon" read -- Our process in general comprises contacting a hydrocarbon --; and should be the beginning of a new paragraph; column 2, line 35, for "Angsrtom" read -- Angstrom --; column 5, line 15, for "a" read -- as --; line 65, for "arising" read -- raising --; column 6, line 23, for "50" read -- 500 --.

Signed and sealed this 13th day of December 1960.

(SEAL)

Attest:

KARL H. AXLINE
Attesting Officer

ROBERT C. WATSON
Commissioner of Patents